(12) United States Patent
Chiu et al.

(10) Patent No.: US 11,099,674 B2
(45) Date of Patent: Aug. 24, 2021

(54) PIXEL ARRAY SUBSTRATE

(71) Applicant: Au Optronics Corporation, Hsinchu (TW)

(72) Inventors: Kuan-Yu Chiu, Hsinchu (TW); Teng-Fu Tung, Hsinchu (TW); Yi-Chi Chen, Hsinchu (TW); Ming-Hsuan Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 80 days.

(21) Appl. No.: 16/739,101

(22) Filed: Jan. 9, 2020

(65) Prior Publication Data
US 2021/0034183 A1    Feb. 4, 2021

(30) Foreign Application Priority Data

Jul. 30, 2019  (TW) ................. 108127079

(51) Int. Cl.
*G06F 3/041* (2006.01)
(52) U.S. Cl.
CPC ........ *G06F 3/0412* (2013.01); *G06F 3/04166* (2019.05); *G06F 2203/04103* (2013.01)
(58) Field of Classification Search
CPC ............... G06F 3/0412; G06F 3/04166; G06F 2203/04103; G06F 3/0443; G02F 1/136286; G02F 1/134309; G02F 1/13338
See application file for complete search history.

(56) References Cited

U.S. PATENT DOCUMENTS

| | | |
|---|---|---|
| 2013/0043473 A1 | 2/2013 | Kim et al. |
| 2017/0192569 A1 | 7/2017 | Jeon et al. |
| 2017/0205934 A1 * | 7/2017 | Lee .................. G02F 1/1368 |
| 2019/0050100 A1 | 2/2019 | Ma et al. |
| 2019/0079620 A1 | 3/2019 | Yoshida |
| 2019/0286267 A1 | 9/2019 | Lin et al. |

FOREIGN PATENT DOCUMENTS

| | | |
|---|---|---|
| CN | 104978069 | 10/2015 |
| CN | 105373252 | 3/2016 |
| CN | 106125428 | 11/2016 |
| CN | 108196723 | 6/2018 |
| CN | 108646943 | 10/2018 |

OTHER PUBLICATIONS

"Examination Report of Singapore Counterpart Application", dated Jan. 13, 2021, p. 1-p. 5.

* cited by examiner

*Primary Examiner* — Adam R. Giesy
(74) *Attorney, Agent, or Firm* — JCIPRNET

(57) ABSTRACT

A pixel array substrate includes a first touch signal line having a first and second portion and a bridge portion, pixel structures including a first and second pixel structure, a first and second data line, a first and second connection pattern, and a touch electrode. The first pixel structure and the second pixel structure are respectively located on a first and second side of the first touch signal line. The first data line and the second data line are respectively located on the second and first sides of the first touch signal line. The first connection pattern is electrically connected to the first data line and the first pixel structure. The second connection pattern is electrically connected to the second data line and the second pixel structure. The bridge portion of the first touch signal line crosses over the first connection pattern and the second connection pattern.

12 Claims, 10 Drawing Sheets

PIXEL ARRAY SUBSTRATE

CROSS-REFERENCE TO RELATED APPLICATION

This application claims the priority benefit of Taiwan application serial no. 108127079, filed on Jul. 30, 2019. The entirety of the above-mentioned patent application is hereby incorporated by reference herein and made a part of this specification.

BACKGROUND OF THE INVENTION

Field of the Invention

The invention relates to a pixel array substrate, and more particularly, to a pixel array substrate including a touch electrode.

Description of Related Art

In today's information society, human dependence on electronic products is increasing. In order to achieve the objects of higher convenience, lighter weight, and higher user friendliness, many information products have transitioned from traditional keyboard or mouse input devices to the use of touch panels as input devices. Among them, the touch display panel with both touch and display functions is one of the popular products today. In order to make the touch display panel thin, the touch electrode may be integrated into the pixel array substrate of the touch display panel. However, how to make the pixel array substrate have both good electrical properties and touch function is a big issue.

SUMMARY OF THE INVENTION

The invention provides a pixel array substrate with good electrical properties and a touch function.

A pixel array substrate of the invention includes a substrate, a first touch signal line, a plurality of pixel structures, a first data line, a second data line, a first connection pattern, a second connection pattern, and a touch electrode. The first touch signal line is disposed on the substrate and has a first side and a second side opposite to each other. The first touch signal line has a first portion, a second portion, and a bridge portion. Each of the plurality of pixel structures includes an active element, an extended pattern, and a pixel electrode. The active element has a first end, a second end, and a control end. The extended pattern is electrically connected to the second end of the active element. The pixel electrode is electrically connected to the extended pattern. The plurality of pixel structures include a first pixel structure and a second pixel structure. The first pixel structure is located on the first side of the first touch signal line, and the second pixel structure is located on the second side of the first touch signal line. The first data line is located on the second side of the first touch signal line, and the second data line is located on the first side of the first touch signal line. The first connection pattern is electrically connected to the first data line and the first end of the active element of the first pixel structure. The second connection pattern is electrically connected to the second data line and the first end of the active element of the second pixel structure. The bridge portion of the first touch signal line crosses over the first connection pattern and the second connection pattern to be electrically connected to the first portion of the first touch signal line and the second portion of the first touch signal line.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
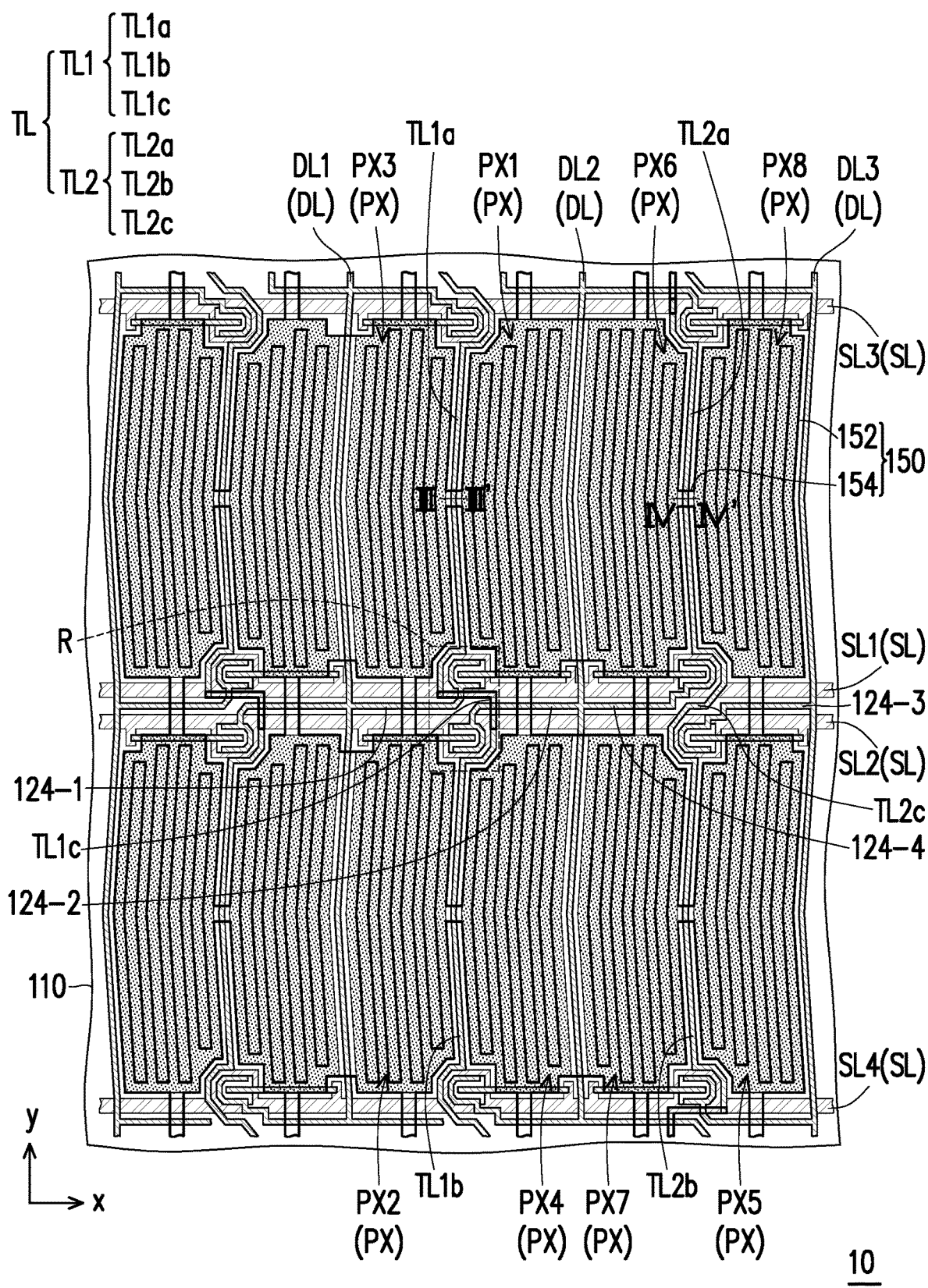
FIG. 1 is a top view of a pixel array substrate 10 of an embodiment of the invention.

Hereinafter, exemplary embodiments of the invention are described in detail, and examples of the exemplary embodiments are conveyed via the figures. Wherever possible, the same reference numerals are used in the figures and the descriptions to refer to the same or similar portions.

It should be understood that, when a layer, film, region, or an element of a substrate is "on" another element or "connected to" another element, the element may be directly on the other element or connected to the other element, or an intermediate element may also be present. On the other hand, when an element is "directly on another element" or "directly connected to" another element, an intermediate element is not present. As used in the present specification, "connected to" may refer to a physical and/or electrical connection. Furthermore, "electrically connected" or "coupled" may mean that other elements are present between two elements.

"About", "similar", or "substantially" used in the present specification include the value and the average value within an acceptable deviation range of a specific value confirmed by those having ordinary skill in the art, and the concerned measurement and a specific quantity (i.e., limitations of the measuring system) of measurement-related errors are taken into consideration. For instance, "about" may represent within one or a plurality of standard deviations of the value, or within ±30%, ±20%, ±10%, or ±5%. Moreover, "about", "similar", or "substantially" used in the present specification may include a more acceptable deviation range or standard deviation according to optical properties, etching properties, or other properties, and one standard deviation does not need to apply to all of the properties.

Unless otherwise stated, all of the terminology used in the present specification (including technical and scientific terminology) have the same definition as those commonly understood by those skilled in the art of the invention. It should be further understood that, terminology defined in commonly-used dictionaries should be interpreted to have the same definitions in related art and in the entire specification of the invention, and are not interpreted as ideal or overly-formal definitions unless clearly stated as such in the present specification.

FIG. 1 is a top view of a pixel array substrate 10 of an embodiment of the invention.

Figure 2:
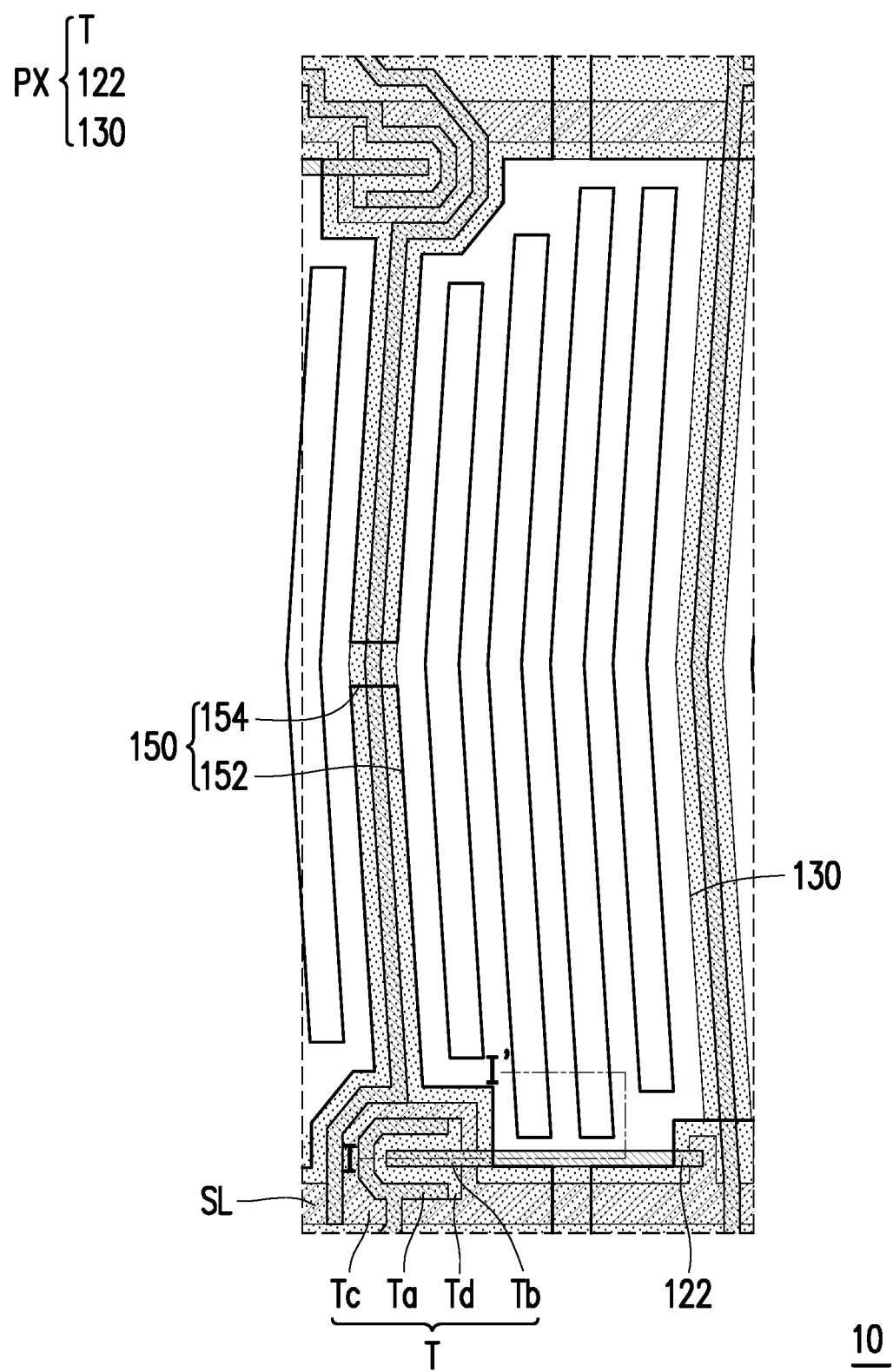
FIG. 2 shows one pixel structure PX of the pixel array substrate 10 of FIG. 1.

FIG. 2 shows one pixel structure PX of the pixel array substrate 10 of FIG. 1.

Figure 3:
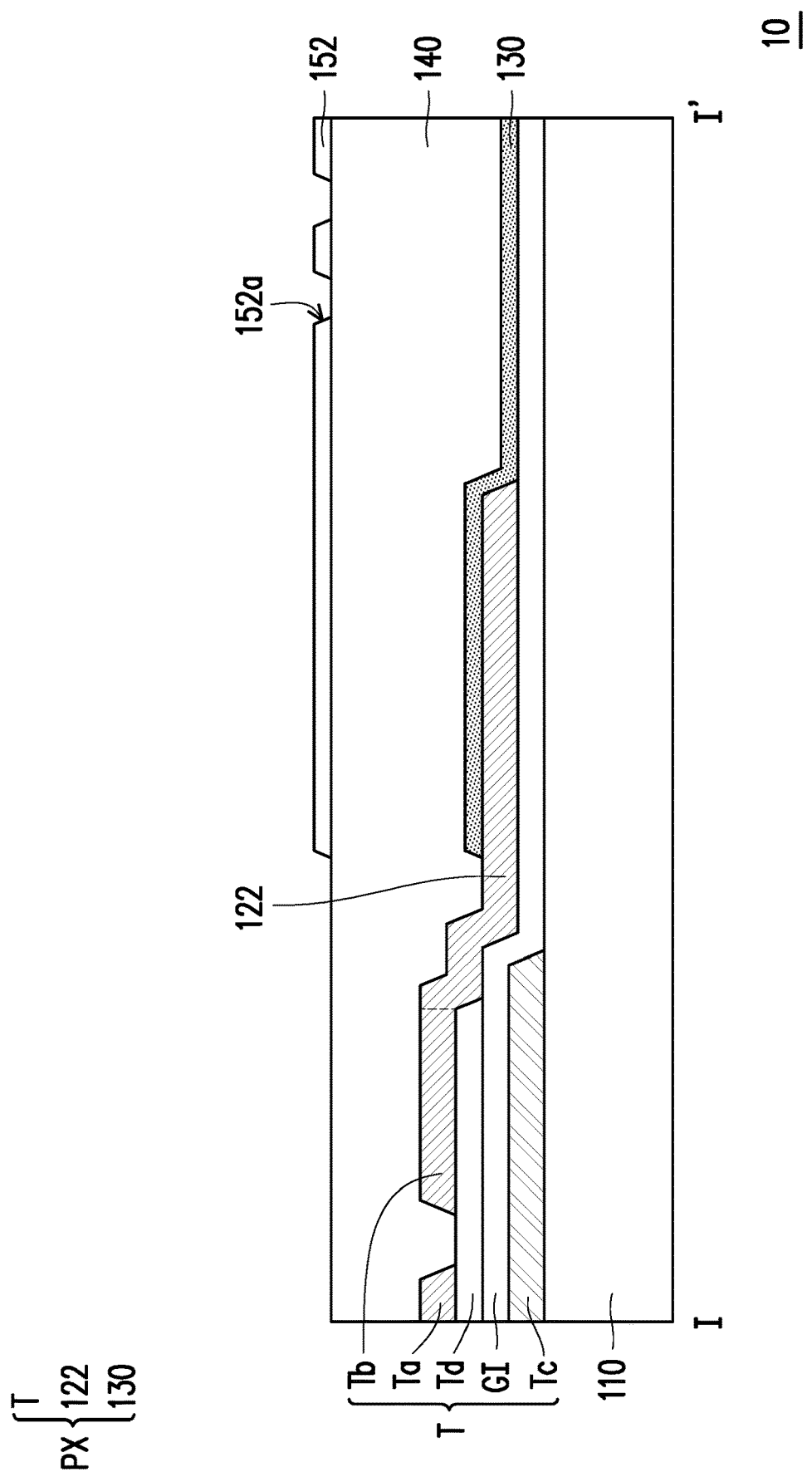
FIG. 3 is a cross-sectional view of the pixel array substrate 10 of an embodiment of the invention.

FIG. 3 is a cross-sectional view of the pixel array substrate 10 of an embodiment of the invention. FIG. 3 corresponds to section line I-I' of FIG. 2.

Figure 4:
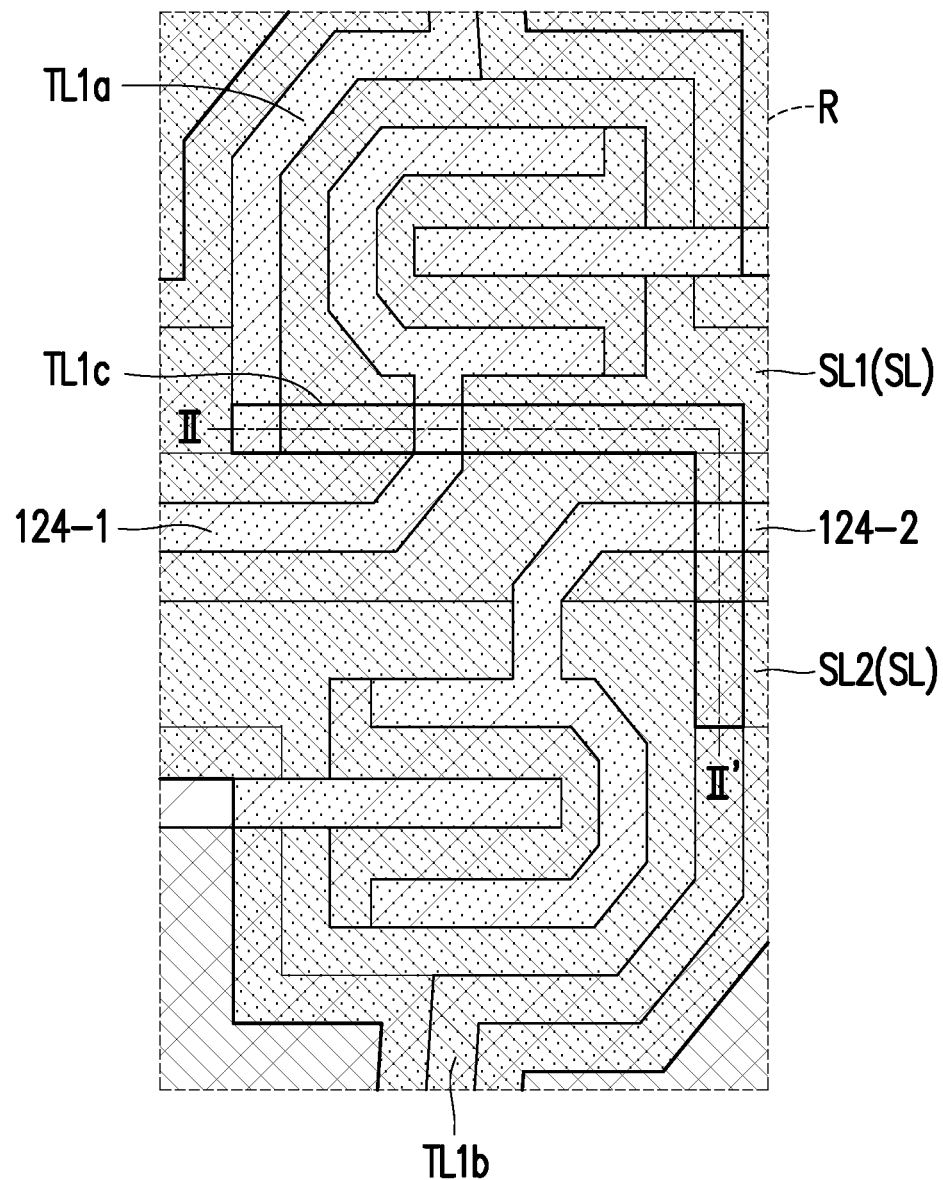
FIG. 4 is a partially enlarged view of the pixel array substrate 10 of an embodiment of the invention.

FIG. 4 is a partially enlarged view of the pixel array substrate 10 of an embodiment of the invention. FIG. 4 corresponds to a portion R of FIG. 1.

Figure 5:
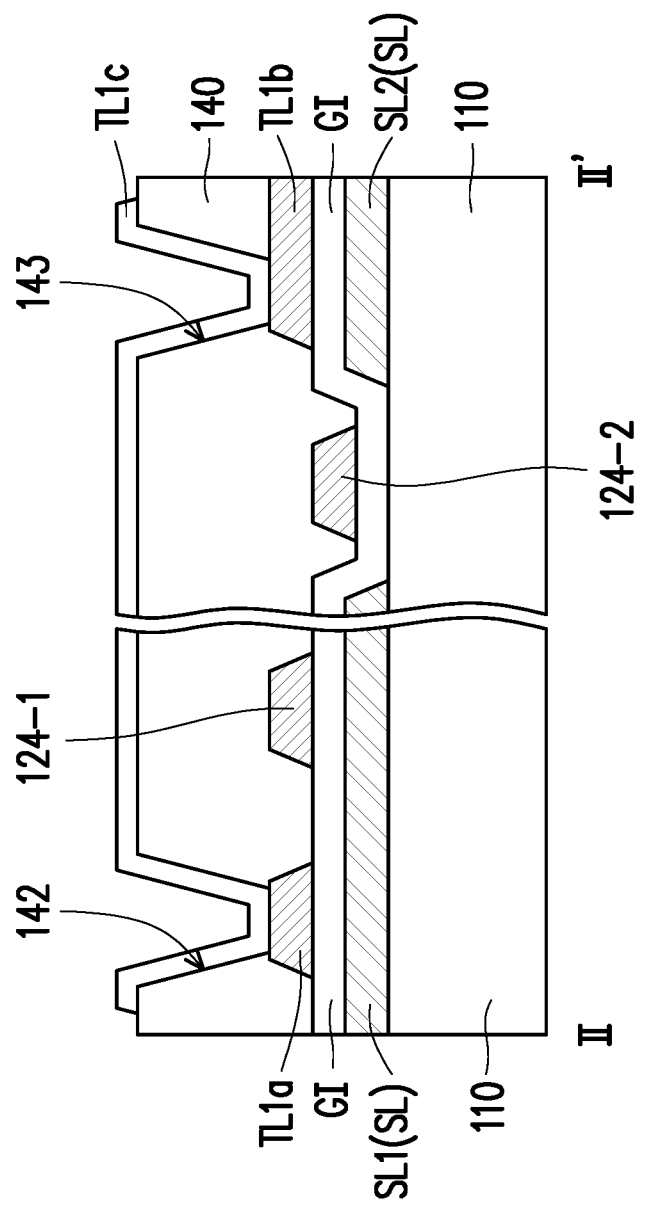
FIG. 5 is a cross-sectional view of the pixel array substrate 10 of an embodiment of the invention.

FIG. 5 is a cross-sectional view of the pixel array substrate 10 of an embodiment of the invention. FIG. 5 corresponds to section line II-II' of FIG. 4.

Figure 6:
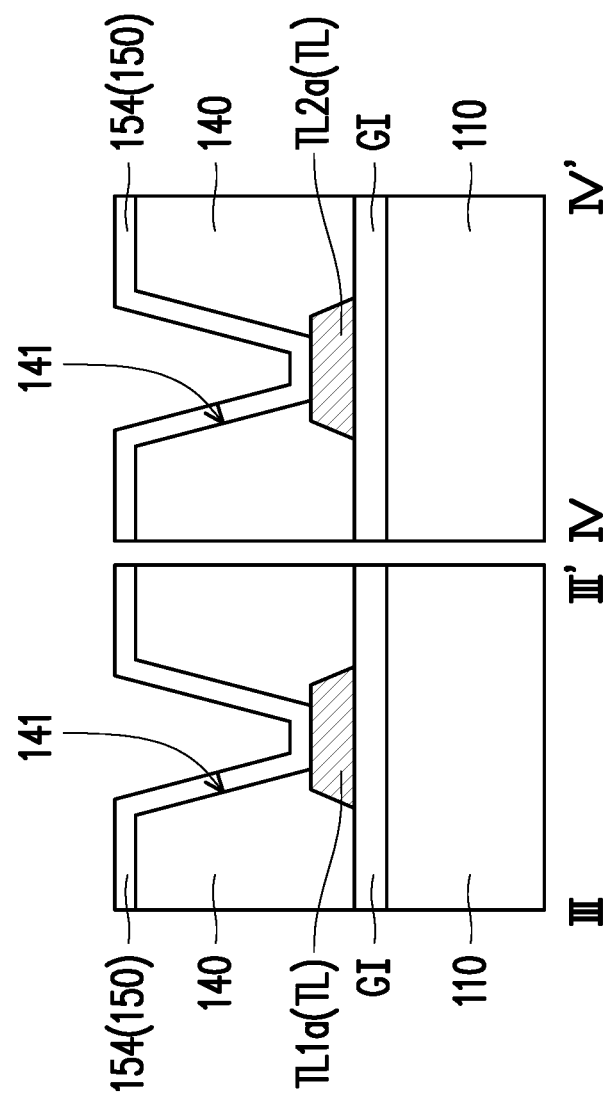
FIG. 6 is a cross-sectional view of the pixel array substrate 10 of an embodiment of the invention.

FIG. 6 is a cross-sectional view of the pixel array substrate 10 of an embodiment of the invention. FIG. 6 corresponds to section line III-III' and section line IV-IV' of FIG. 1.

FIG. 1, FIG. 2, and FIG. 4 omit contacts 141, 142, and 143 of an insulating layer 140 of FIG. 5 and FIG. 6.

Referring to FIG. 1 and FIG. 2, the pixel array substrate 10 includes a substrate 110 and a plurality of pixel structures PX disposed on the substrate 110. The substrate 110 is used to carry the elements of the pixel array substrate 10. For example, in the present embodiment, the material of the substrate 110 may be glass, quartz, organic polymer, or an opaque/reflective material (such as wafer, ceramic, or other applicable materials), or other applicable materials.

Referring to FIG. 2 and FIG. 3, each of the pixel structures PX includes an active element T, an extended pattern 122, and a pixel electrode 130. Specifically, in the present embodiment, the active element T may include a thin-film transistor having a control end Tc, a gate insulating layer GI, a semiconductor pattern Td, a first end Ta, and a second end Tb, wherein the gate insulating layer GI is disposed between the control end Tc and the semiconductor pattern Td, and the first end Ta and the second end Tb are electrically connected to two different regions of the semiconductor pattern Td, respectively. In the present embodiment, the control end Tc may be optionally disposed below the semiconductor pattern Td, and the thin-film transistor may be a bottom-gate thin-film transistor (bottom-gate TFT). However, the invention is not limited thereto, and in other embodiments, the thin-film transistor T may also be a top-gate thin-film transistor (top-gate TFT) or other suitable types of thin-film transistors.

The extended pattern 122 is electrically connected to the active element T. Specifically, in the present embodiment, the extended pattern 122 is electrically connected to the second end Tb of the active element T and extended from the second end Tb to the outside of the semiconductor pattern Td. For example, in the present embodiment, the extended pattern 122 and the second end Tb of the active element T may be formed on the same conductive layer, and the extended pattern 122 and the second end Tb of the active element T may be directly connected, but the invention is not limited thereto.

The pixel electrode 130 is electrically connected to the extended pattern 122. For example, in the present embodiment, a portion of the pixel electrode 130 may be directly disposed on the extended pattern 122 so that the pixel electrode 130 may be electrically connected to the second end Tb of the active element T via the extended pattern 122, but the invention is not limited thereto.

In the present embodiment, each of the pixel structures PX may further include a common electrode 152. The common electrode 152 and the pixel electrode 130 of the same pixel structure PX are overlapped with each other, and the insulating layer 140 is provided between the common electrode 152 and the pixel electrode 130 of the same pixel structure PX. For example, in the present embodiment, the insulating layer 140 is disposed on the pixel electrode 130, the common electrode 152 is disposed on the insulating layer 140, and the common electrode 152 has a plurality of slits 152a. In other words, in the present embodiment, the pixel structure PX may be a top-common structure (i.e., the pixel electrode 130 is formed on a first transparent conductive layer, and the common electrode 152 is formed on a second transparent conductive layer). However, the invention is not limited thereto. According to other embodiments, the pixel structure PX may also be a top-pixel electrode structure and is described in the following paragraphs with other figures.

Referring to FIG. 1 and FIG. 2, the pixel array substrate 10 further includes a plurality of data lines DL and a plurality of scan lines SL. The first end Ta of the active element T of each of the pixel structures PX is electrically connected to a corresponding data line DL, and the control end Tc of the active element T of each of the pixel structures PX is electrically connected to a corresponding scan line SL. In the present embodiment, the plurality of data lines DL are arranged in a first direction x, and the plurality of scan lines SL are arranged in a second direction y, wherein the first direction x and the second direction y are staggered. For example, in the present embodiment, the first direction x and the second direction y may be perpendicular, but the invention is not limited thereto.

In the present embodiment, the plurality of common electrodes 152 of the plurality of pixel structures PX of the pixel array substrate 10 may form a plurality of touch electrodes 150. Each of the touch electrodes 150 may include a plurality of common electrodes 152 of a plurality of adjacent pixel structures PX and at least one bridge pattern 154, wherein the plurality of common electrodes 152 of the same touch electrode 150 may be electrically connected to each other by using the at least one bridge pattern 154. In the present embodiment, the common electrodes 152 and the at least one bridge pattern 154 may be formed on the same conductive layer, but the invention is not limited thereto.

Referring to FIG. 1 and FIG. 6, the pixel array substrate 10 further includes a plurality of touch signal lines TL. Each of the touch signal lines TL is electrically connected to one corresponding touch electrode 150. For example, in the present embodiment, each of the touch electrodes 150 may be electrically connected to at least one touch signal line TL via at least one contact 141 of the insulating layer 140, but the invention is not limited thereto.

Referring to FIG. 1, the plurality of touch signal lines TL include a first touch signal line TL1. The first touch signal line TL1 is disposed on the substrate 110 and has a first side (e.g., right side) and a second side (e.g., left side) opposite to each other. The plurality of pixel structures PX include a first pixel structure PX1 and a second pixel structure PX2.

The first pixel structure PX1 is located on the first side (e.g., right side) of the first touch signal line TL1, and the second pixel structure PX2 is located on the second side (e.g., left side) of the first touch signal line TL1.

Referring to FIG. 1 and FIG. 2, the plurality of scan lines SL include a first scan line SL1 and a second scan line SL2. The first scan line SL1 is electrically connected to the control end Tc of the active element T of the first pixel structure PX1. The second scan line SL2 is electrically connected to the control end Tc of the active element T of the second pixel structure PX2. The first scan line SL1 and the second scan line SL2 have a first side (e.g., upper side) and a second side (e.g., lower side) opposite to each other. The first pixel structure PX1 is located on the first side (e.g., right side) of the first touch signal line TL1 and the first side (e.g., upper side) of the first scan line SL1 and the second scan line SL2, and the second pixel structure PX2 is located on the second side (e.g., left side) of the first touch signal line TL1 and the second side (e.g., lower side) of the first scan line SL1 and the second scan line SL2. In the present embodiment, the plurality of scan lines SL and the control end Tc of the plurality of active elements T may be formed on the same conductive layer (e.g., first metal layer), but the invention is not limited thereto.

The plurality of data lines DL include a first data line DL1 and a second data line DL2, wherein the first data line DL1 is located on the second side (e.g., left side) of the first touch signal line TL1, and the second data line DL2 is located on the first side (e.g., right side) of the first touch signal line TL1. The first end Ta of the active element T of the first pixel structure PX1 is electrically connected to the first data line DL1. The first end Ta of the active element T of the second pixel structure PX2 is electrically connected to the second data line DL2. In the present embodiment, the polarity of the first data line DL1 and the polarity of the second data line DL2 are opposite at the same drive timing, that is, within the same frame time.

The plurality of pixel structures PX further include a third pixel structure PX3 and a fourth pixel structure PX4. The third pixel structure PX3 is located on the second side (e.g., left side) of the first touch signal line TL1 and the first side (e.g., upper side) of the first scan line SL1 and the second scan line SL2. The first end Ta of the active element T of the third pixel structure PX1 is electrically connected to the first data line DL1. The control end Tc of the active element T of the third pixel structure PX3 is electrically connected to the third scan line SL3 on the first side (e.g., upper side) of the first scan line SL1 and the second scan line SL2. The fourth pixel structure PX4 is located on the first side (e.g., right side) of the first touch signal line TL1 and the second side (e.g., lower side) of the first scan line SL1 and the second scan line SL2. The first end Ta of the active element T of the fourth pixel structure PX4 is electrically connected to the second data line DL2. The control end Tc of the active element T of the fourth pixel structure PX4 is electrically connected to the fourth scan line SL4 on the second side (e.g., lower side) of the first scan line SL1 and the second scan line SL2.

The pixel array substrate 10 further includes a first connection pattern 124-1 and a second connection pattern 124-2. The first connection pattern 124-1 is electrically connected to the first data line DL1 and the first end Ta of the active element T of the first pixel structure PX1. In the present embodiment, the first connection pattern 124-1 is extended from the first end Ta of the active element T of the first pixel structure PX1 to the first data line DL1 located on the second side (e.g., left side) of the first touch signal line TL1, and the extended pattern 122 of the first pixel structure PX1 is extended from the second end Tb of the active element T of the first pixel structure PX1 to the second data line DL2 located on the first side (e.g., right side) of the first touch signal line TL1. In short, in the present embodiment, the extended pattern 122 of the first pixel structure PX1 and the first connection pattern 124-1 are extended in opposite directions.

The second connection pattern 124-2 is electrically connected to the second data line DL2 and the first end Ta of the active element T of the second pixel structure PX2. The second connection pattern 124-2 is extended from the first end Ta of the active element T of the second pixel structure PX2 to the second data line DL2 located on the first side (e.g., right side) of the first touch signal line TL1, and the extended pattern 122 of the second pixel structure PX2 is extended from the second end Tb of the active element T of the second pixel structure PX2 to the first data line DL1 located on the second side (e.g., left side) of the first touch signal line TL1. In short, in the present embodiment, the extended pattern 122 of the second pixel structure PX2 and the second connection pattern 124-2 are extended in opposite directions.

In the present embodiment, the first connection pattern 124-1, the second connection pattern 124-2, the plurality of data lines DL, the plurality of first ends Ta, and the plurality of second ends Tb of the plurality of active elements T may be formed on the same conductive layer (e.g., second metal layer), but the invention is not limited thereto.

Referring to FIG. 1, FIG. 4, and FIG. 5, the first touch signal line TL1 has a first portion TL1$a$, a second portion TL1$b$, and a bridge portion TL1$c$. In the present embodiment, the bridge portion TL1$c$ and the first portion TL1$a$ are respectively formed on different conductive layers, and the bridge portion TL1$c$ and the second portion TL1$b$ are respectively formed on different conductive layers. For example, in the present embodiment, the first portion TL1$a$ and the second portion TL1$b$ of the first touch signal line TL1 may be formed on the same conductive layer (e.g., second metal layer) with the data line DL, and the bridge portion TL1$c$ of the first touch signal line TL1 and the touch electrode 150 may be formed on the same conductive layer (e.g., second transparent conductive layer), but the invention is not limited thereto.

Please refer to FIG. 1 and FIG. 2. In the present embodiment, the vertical projection of the first portion TL1$a$ of the first touch signal line TL1 on the substrate 110 is located between the vertical projection of the pixel electrode 130 of the first pixel structure PX1 on the substrate 110 and the vertical projection of the pixel electrode 130 of the third pixel structure PX3 on the substrate 110. The vertical projection of the second portion TL1$b$ of the first touch signal line TL1 on the substrate 110 is located between the vertical projection of the pixel electrode 130 of the second pixel structure PX2 on the substrate 110 and the vertical projection of the pixel electrode 130 of the fourth pixel structure PX4 on the substrate 110.

Referring to FIG. 1, the bridge portion TL1$c$ of the first touch signal line TL1 crosses over the first connection pattern 124-1 and the second connection pattern 124-2 to be electrically connected to the first portion TL1$a$ of the first touch signal line TL1 and the second portion TL1$b$ of the first touch signal line TL1. Please refer to FIG. 1, FIG. 4, and FIG. 5. For example, in the present embodiment, two ends of the bridge portion TL1$c$ of the first touch signal line TL1 may be electrically connected to the first portion TL1$a$ of the first touch signal line TL1 and the second portion TL1$b$ of the first touch signal line TL1 via the plurality of contacts 142 and 143 of the insulating layer 140 respectively, but the invention is not limited thereto.

Please refer to FIG. 1. In the present embodiment, at least a portion of the vertical projection of the bridge portion TL1c of the first touch signal line TL1 on the substrate 110 is located between the vertical projection of the first scan line SL1 on the substrate 110 and the vertical projection of the second scan line SL2 on the substrate 110. In the present embodiment, the bridge portion TL1c of the first touch signal line TL1 may be substantially L-shaped. However, the invention is not limited thereto. According to other embodiments, the bridge portion TL1c of the first touch signal line TL1 may have other shapes.

Referring to FIG. 1 and FIG. 2, the plurality of touch signal lines TL further include a second touch signal line TL2. The second touch signal line TL2 is disposed on the substrate 110 and has a first side (e.g., right side) and a second side (e.g., left side) opposite to each other. The plurality of pixel structures PX include a fifth pixel structure PX5. The fifth pixel structure PX5 is located on the first side (e.g., right side) of the second touch signal line TL2 and the second side (e.g., lower side) of the first scan line SL1 and the second scan line SL2. The pixel array substrate 10 further includes a third data line DL3. The third data line DL3 is located on the first side (e.g., right side) of the second touch signal line TL2. The first end Ta of the active element T of the fifth pixel structure PX5 is electrically connected to the third data line DL3. The control end Tc of the active element T of the fifth pixel structure PX5 is electrically connected to the second scan line SL2.

In the present embodiment, the first data line DL1, the first touch signal line TL1, the second data line DL2, the second touch signal line TL2, and the third data line DL3 may be sequentially arranged in the first direction x. In addition, in the present embodiment, at the same drive timing, that is, within the same frame time, the polarity of the third data line DL3 is opposite to the polarity of the second data line DL2, and the polarity of the third data line DL3 is the same as the polarity of the first data line DL1.

The plurality of pixel structures PX further include a sixth pixel structure PX6. The sixth pixel structure PX6 and the second data line DL2 are located on the second side (e.g., left side) of the second touch signal line TL2 and the first side (e.g., upper side) of the first scan line SL1 and the second scan line SL2. The first end Ta of the active element T of the sixth pixel structure PX6 is electrically connected to the second data line DL2. The control end Tc of the active element T of the sixth pixel structure PX6 is electrically connected to the first scan line SL1.

The pixel array substrate 10 further includes a third connection pattern 124-3. The third connection pattern 124-3 is electrically connected to the third data line DL3 and the first end Ta of the active element T of the fifth pixel structure PX5. In the present embodiment, the third connection pattern 124-3 is extended from the first end Ta of the active element T of the fifth pixel structure PX5 to the third data line DL3 located on the first side (e.g., right side) of the second touch signal line TL2, and the extended pattern 122 of the fifth pixel structure PX5 is extended from the second end Tb of the active element T of the fifth pixel structure PX5 to the third data line DL3 located on the first side (e.g., right side) of the second touch signal line TL2. In short, the third connection pattern 124-3 and the extended pattern 122 of the fifth pixel structure PX5 are extended in substantially the same direction.

The pixel array substrate 10 further includes a fourth connection pattern 124-4. The fourth connection pattern 124-4 is electrically connected to the second data line DL2 and the first end Ta of the active element T of the sixth pixel structure PX6. In the present embodiment, the fourth connection pattern 124-4 is extended from the first end Ta of the active element T of the sixth pixel structure PX6 to the second data line DL2 located on the second side (e.g., left side) of the second touch signal line TL2, and the extended pattern 122 of the sixth pixel structure PX6 is extended from the second end Tb of the active element T of the sixth pixel structure PX6 to the second data line DL2 located on the second side (e.g., left side) of the second touch signal line TL2. In short, the fourth connection pattern 124-4 and the extended pattern 122 of the sixth pixel structure PX6 are extended in substantially the same direction.

The plurality of pixel structures PX further include a seventh pixel structure PX7 and an eighth pixel structure PX8. The seventh pixel structure PX7 is located on the second side (e.g., left side) of the second touch signal line TL2 and the second side (e.g., lower side) of the first scan line SL1 and the second scan line SL2. The first end Ta of the active element T of the seventh pixel structure PX7 is electrically connected to the third data line DL3. The control end Tc of the active element T of the seventh pixel structure PX7 is electrically connected to the fourth scan line SL4. The eighth pixel structure PX8 is located on the first side (e.g., right side) of the second touch signal line TL2 and the first side (e.g., upper side) of the first scan line SL1 and the second scan line SL2. The first end Ta of the active element T of the eighth pixel structure PX8 is electrically connected to the second data line DL2. The control end Tc of the active element T of the eighth pixel structure PX8 is electrically connected to the third scan line SL3.

The second touch signal line TL2 includes a first portion TL2a, a second portion TL2b, and a bent portion TL2c. In the present embodiment, the vertical projection of the first portion TL2a of the second touch signal line TL2 on the substrate 110 is located between the vertical projection of the pixel electrode 130 of the sixth pixel structure PX6 on the substrate 110 and the vertical projection of the pixel electrode 130 of the eighth pixel structure PX8 on the substrate 110; the vertical projection of the second TL2b of the second touch signal line TL2 on the substrate 110 is located between the vertical projection of the pixel electrode 130 of the fifth pixel structure PX5 on the substrate 110 and the vertical projection of the pixel electrode 130 of the seventh pixel structure PX7 on the substrate 110; and the bent portion TL2c of the second touch signal line TL2 is located between the third connection pattern 124-3 and the fourth connection pattern 124-4.

In the present embodiment, the first portion TL2a of the second touch signal line TL2, the second portion TL2b of the second touch signal line TL2, and the bent portion TL2c of the second touch signal line TL2 may be formed on the same film layer (e.g., second metal layer), and two ends of the bent portion TL2c may be directly connected to the first portion TL2a and the second portion TL2b respectively. In addition, in the present embodiment, the bent portion TL2c of the second touch signal line TL2 may be substantially S-shaped. However, the invention is not limited thereto. According to other embodiments, the bent portion TL2c of the second touch signal line TL2 may also have other shapes.

It is worth mentioning that via the above configuration and electrical connection method, the pixel array substrate 10 of the present embodiment has low power consumption and may reduce the influence caused by the capacitance coupling effect between the pixel electrode 130 and the data line DL. More importantly, via the configuration of the touch signal line TL, the pixel array substrate 10 not only may maintain the above advantages of low power consumption and reducing the influence of the capacitive coupling effect between the pixel electrode 130 and the data line DL, but the array substrate 10 also has a touch function.

It should be mentioned here that, the following embodiments adopt the reference numerals of the embodiments above and a portion of the content thereof, wherein the same reference numerals are used to represent the same or similar devices and descriptions of the same technical content are omitted. The omitted portions are as described in the embodiments above and are not repeated in the embodiments below.

Figure 7:
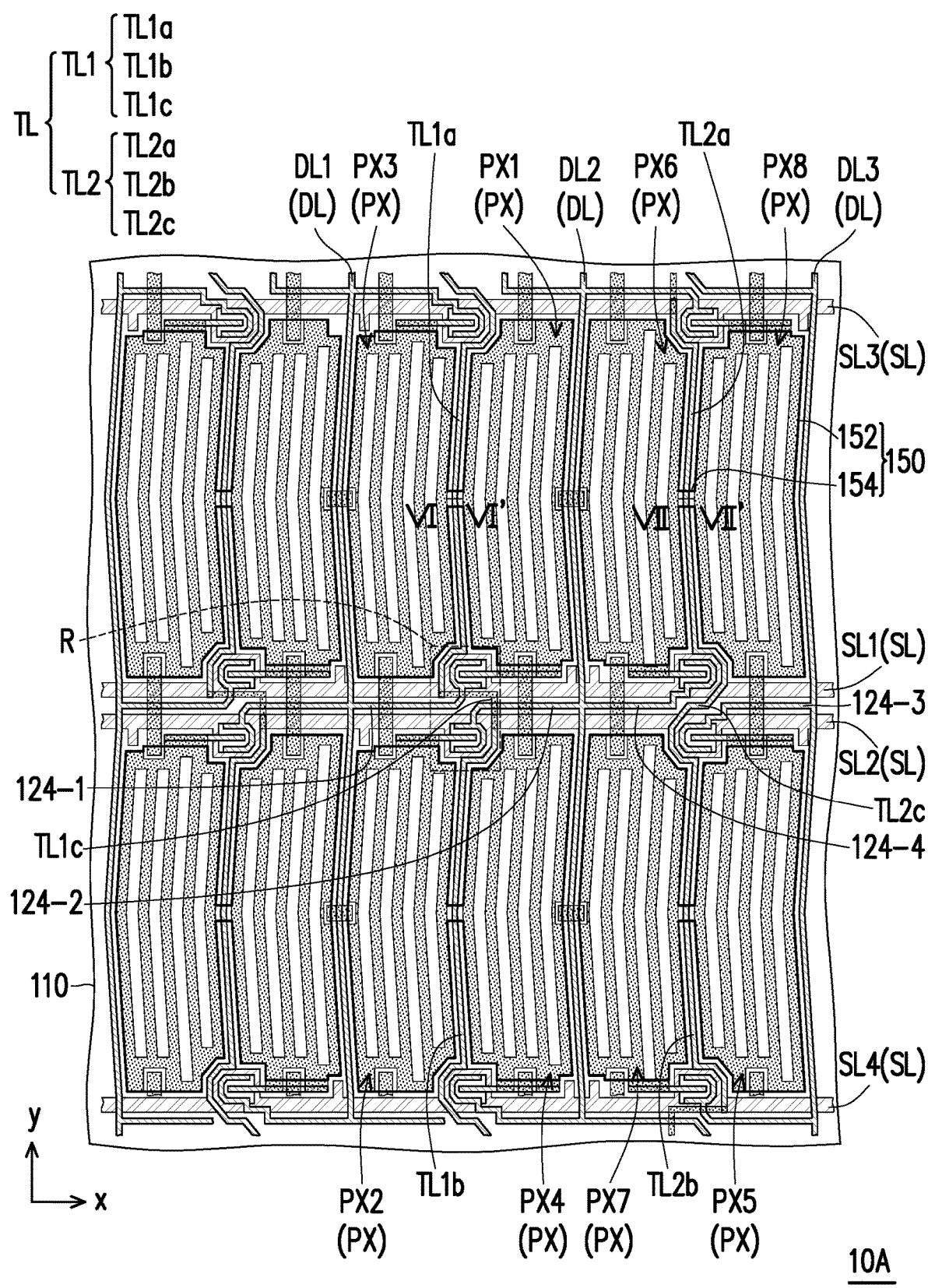
FIG. 7 is a top view of a pixel array substrate 10A of another embodiment of the invention.

FIG. 7 is a top view of a pixel array substrate 10A of another embodiment of the invention.

Figure 8:
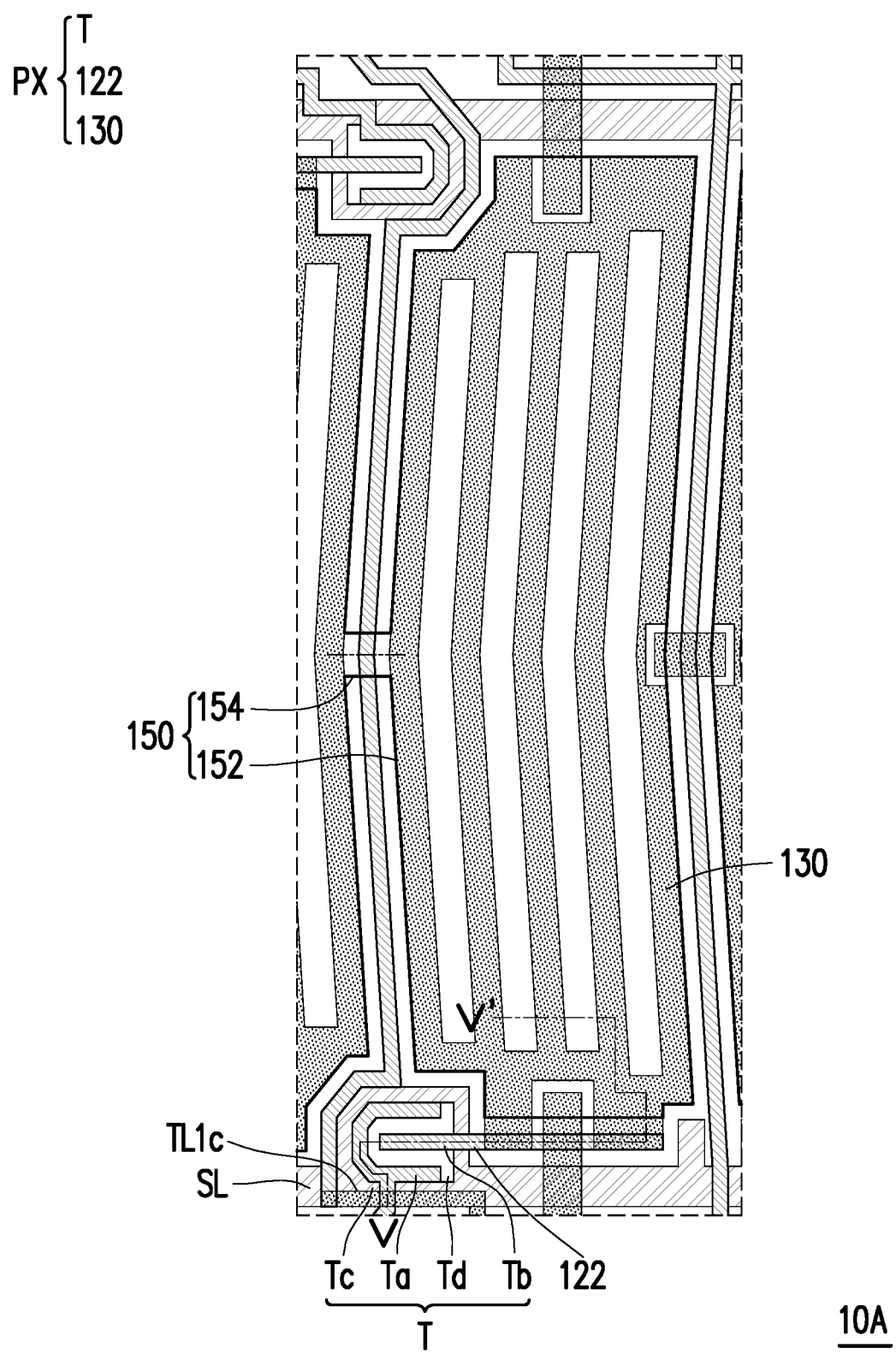
FIG. 8 shows one pixel structure PX of the pixel array substrate 10A of FIG. 7.

FIG. 8 shows one pixel structure PX of the pixel array substrate 10A of FIG. 7.

Figure 9:
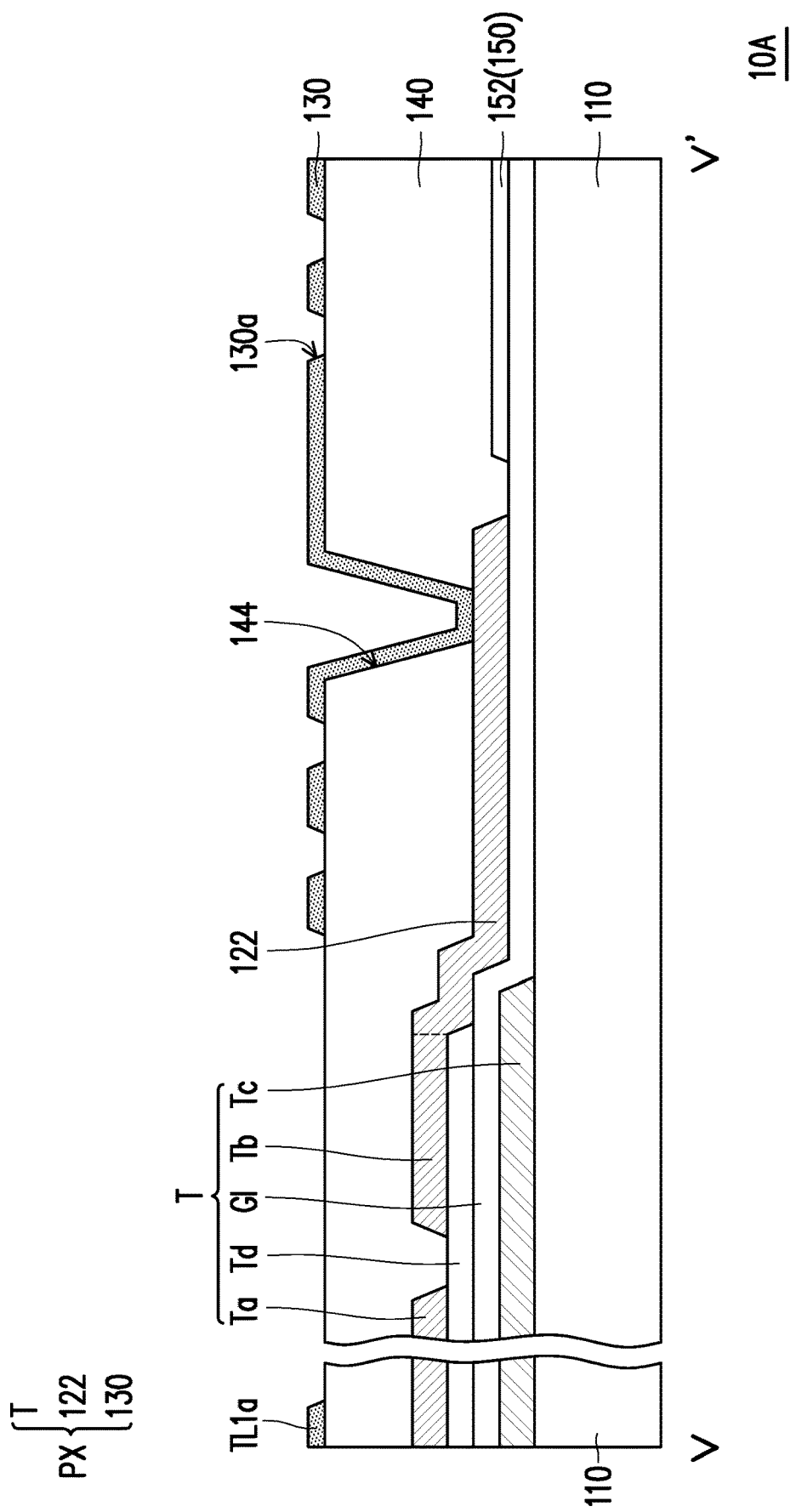
FIG. 9 is a cross-sectional view of the pixel array substrate 10A of an embodiment of the invention.

FIG. 9 is a cross-sectional view of the pixel array substrate 10A of an embodiment of the invention. FIG. 9 corresponds to section line V-V' of FIG. 8.

Figure 10:
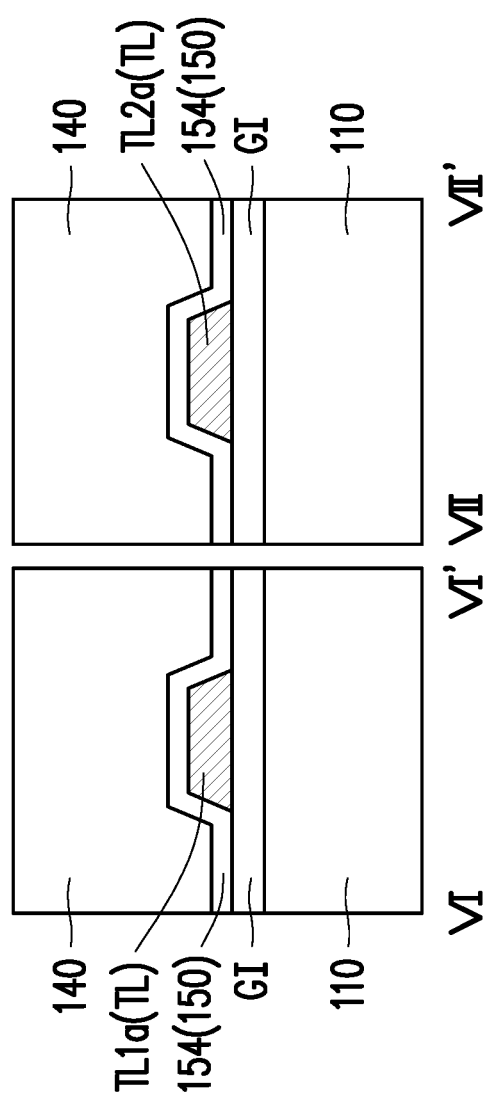
FIG. 10 is a cross-sectional view of the pixel array substrate 10A of an embodiment of the invention.

FIG. 10 is a cross-sectional view of the pixel array substrate 10A of an embodiment of the invention. FIG. 10 corresponds to section line VI-VI' and section line VII-VII' of FIG. 7.

FIG. 7 and FIG. 8 omit the illustration of a contact 144 of FIG. 9.

Please refer to FIG. 7 to FIG. 10. The pixel array substrate 10A of the present embodiment is similar to the pixel array substrate 10 above. The difference between the two is that the positions of the pixel electrode 130 and the common electrode 152 of the pixel array substrate 10A and the positions of the pixel electrode 130 and the common electrode 152 of the pixel array substrate 10 are different. Specifically, in the present embodiment, the insulating layer 140 is disposed on the common electrode 152, the pixel electrode 130 is disposed on the insulating layer 140, the pixel electrode 130 is electrically connected to the extended pattern 122 via the contact 144 of the insulating layer 140, and the pixel electrode 130 has a plurality of slits 130a. In other words, in the present embodiment, the pixel structure PX is a top-pixel electrode structure (i.e., the common electrode 152 is formed on the first transparent conductive layer, and the pixel electrode 130 is formed on the second transparent conductive layer). In addition, in the present embodiment, the bridge portion TL1c of the first touch signal line TL1 is formed in the same film layer (e.g., second transparent conductive layer) as the pixel electrode 130.

The pixel array substrate 10A of the present embodiment has similar functions and advantages as the pixel array substrate 10 above, and is not repeated herein.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A pixel array substrate, comprising:
a substrate;
a first touch signal line disposed on the substrate and having a first side and a second side opposite to each other, wherein the first touch signal line has a first portion, a second portion, and a bridge portion;
a plurality of pixel structures, wherein each of the pixel structures comprises:
an active element having a first end, a second end, and a control end;
an extended pattern electrically connected to the second end of the active element; and
a pixel electrode electrically connected to the extended pattern, wherein the pixel structures comprise a first pixel structure and a second pixel structure, the first pixel structure is located on the first side of the first touch signal line, and the second pixel structure is located on the second side of the first touch signal line;
a first data line and a second data line, wherein the first data line is located on the second side of the first touch signal line, and the second data line is located on the first side of the first touch signal line;
a first connection pattern electrically connected to the first data line and the first end of the active element of the first pixel structure;
a second connection pattern electrically connected to the second data line and the first end of the active element of the second pixel structure, wherein the bridge portion of the first touch signal line crosses over the first connection pattern and the second connection pattern to be electrically connected to the first portion of the first touch signal line and the second portion of the first touch signal line; and
a touch electrode at least overlapped with the pixel electrode of the first pixel structure and electrically connected to the first touch signal line.

2. The pixel array substrate of claim 1, further comprising:
a first scan line electrically connected to the control end of the active element of the first pixel structure;
a second scan line electrically connected to the control end of the active element of the second pixel structure, wherein the first scan line and the second scan line have a first side and a second side opposite to each other, the first pixel structure is further located on the first side of the first scan line and the second scan line, and the second pixel structure is further located on the second side of the first scan line and the second scan line;
the pixel structures further comprise a third pixel structure and a fourth pixel structure, wherein the third pixel structure is located on the second side of the first touch signal line and the first side of the first scan line and the second scan line, the first end of the active element of the third pixel structure is electrically connected to the first data line, the fourth pixel structure is located on the first side of the first touch signal line and the second side of the first scan line and the second scan line, and the first end of the active element of the fourth pixel structure is electrically connected to the second data line;
a polarity of the first data line is opposite to a polarity of the second data line.

3. The pixel array substrate of claim 1, further comprising:
a first scan line electrically connected to the control end of the active element of the first pixel structure;
a second scan line electrically connected to the control end of the active element of the second pixel structure, wherein the first scan line and the second scan line have a first side and a second side opposite to each other, the first pixel structure is further located on the first side of the first scan line and the second scan line, and the second pixel structure is further located on the second side of the first scan line and the second scan line;

the pixel structures further comprise a third pixel structure and a fourth pixel structure, wherein the third pixel structure is located on the second side of the first touch signal line and the first side of the first scan line and the second scan line, the first end of the active element of the third pixel structure is electrically connected to the first data line, the fourth pixel structure is located on the first side of the first touch signal line and the second side of the first scan line and the second scan line, and the first end of the active element of the fourth pixel structure is electrically connected to the second data line;

a vertical projection of the first portion of the first touch signal line on the substrate is located between a vertical projection of the pixel electrode of the first pixel structure on the substrate and a vertical projection of the pixel electrode of the third pixel structure on the substrate;

a vertical projection of the second portion of the first touch signal line on the substrate is located between a vertical projection of the pixel electrode of the second pixel structure on the substrate and a vertical projection of the pixel electrode of the fourth pixel structure on the substrate.

4. The pixel array substrate of claim 1, further comprising:
a first scan line electrically connected to the control end of the active element of the first pixel structure;
a second scan line electrically connected to the control end of the active element of the second pixel structure, wherein the first scan line and the second scan line have a first side and a second side opposite to each other, the first pixel structure is further located on the first side of the first scan line and the second scan line, and the second pixel structure is further located on the second side of the first scan line and the second scan line;
at least a portion of a vertical projection of the bridge portion of the first touch signal line on the substrate is located between a vertical projection of the first scan line on the substrate and a vertical projection of the second scan line on the substrate.

5. The pixel array substrate of claim 1, wherein the first connection pattern is extended from the first end of the active element of the first pixel structure to the first data line located on the second side of the first touch signal line, and the extended pattern of the first pixel structure is extended from the second end of the active element of the first pixel structure to the second data line located on the first side of the first touch signal line.

6. The pixel array substrate of claim 5, wherein the second connection pattern is extended from the first end of the active element of the second pixel structure to the second data line located on the first side of the first touch signal line, and the extended pattern of the second pixel structure is extended from the second end of the active element of the second pixel structure to the first data line located on the second side of the first touch signal line.

7. The pixel array substrate of claim 1, further comprising:
a second touch signal line disposed on the substrate and having a first side and a second side opposite to each other, wherein the pixel structures comprise a fifth pixel structure and a sixth pixel structure, the fifth pixel structure is located on the first side of the second touch signal line, the sixth pixel structure and the second data line are located on the second side of the second touch signal line, and the first end of the active element of the sixth pixel structure is electrically connected to the second data line;

a third data line located on the first side of the second touch signal line, wherein the first end of the active element of the fifth pixel structure is electrically connected to the third data line;
a third connection pattern electrically connected to the third data line and the first end of the active element of the fifth pixel structure; and
a fourth connection pattern electrically connected to the second data line and the first end of the active element of the sixth pixel structure;
wherein the second touch signal line has a bent portion, and the bent portion of the second touch signal line is located between the third connection pattern and the fourth connection pattern.

8. The pixel array substrate of claim 7, further comprising:
a first scan line electrically connected to the control end of the active element of the first pixel structure and the control end of the active element of the sixth pixel structure;
a second scan line electrically connected to the control end of the active element of the second pixel structure and the control end of the active element of the fifth pixel structure, wherein the first scan line and the second scan line have a first side and a second side opposite to each other, the first pixel structure and the sixth pixel structure are further located on the first side of the first scan line and the second scan line, and the second pixel structure and the fifth pixel structure are further located on the second side of the first scan line and the second scan line;
the pixel structures further comprise a seventh pixel structure and an eighth pixel structure, wherein the seventh pixel structure is located on the second side of the second touch signal line and the second side of the first scan line and the second scan line, the first end of the active element of the seventh pixel structure is electrically connected to the third data line, the eighth pixel structure is located on the first side of the second touch signal line and the first side of the first scan line and the second scan line, and the first end of the active element of the eighth pixel structure is electrically connected to the second data line;
the polarity of the first data line is the same as a polarity of the third data line.

9. The pixel array substrate of claim 7, wherein the third connection pattern is extended from the first end of the active element of the fifth pixel structure to the third data line located on the first side of the second touch signal line, and the extended pattern of the fifth pixel structure is extended from the second end of the active element of the fifth pixel structure to the third data line located on the first side of the second touch signal line.

10. The pixel array substrate of claim 9, wherein the fourth connection pattern is extended from the first end of the active element of the sixth pixel structure to the second data line located on the second side of the second touch signal line, and the extended pattern of the sixth pixel structure is extended from the second end of the active element of the sixth pixel structure to the second data line located on the second side of the second touch signal line.

11. The pixel array substrate of claim 1, further comprising:
an insulating layer, wherein the insulating layer is disposed on the pixel electrodes of the pixel structures, the touch electrode is disposed on the insulating layer, and the bridge portion of the first touch signal line and the touch electrode are formed on a same film layer.

12. The pixel array substrate of claim 1, further comprising:
an insulating layer, wherein the insulating layer is disposed on the touch electrode, the pixel electrodes of the pixel structures are disposed on the insulating layer, and the bridge portion of the first touch signal line and the pixel electrodes are formed on a same film layer.

* * * * *